(No Model.) 2 Sheets—Sheet 1.
A. MORRISON.
SELF OILING ANTIFRICTION ROLLER JOURNAL BEARING.
No. 496,888. Patented May 9, 1893.
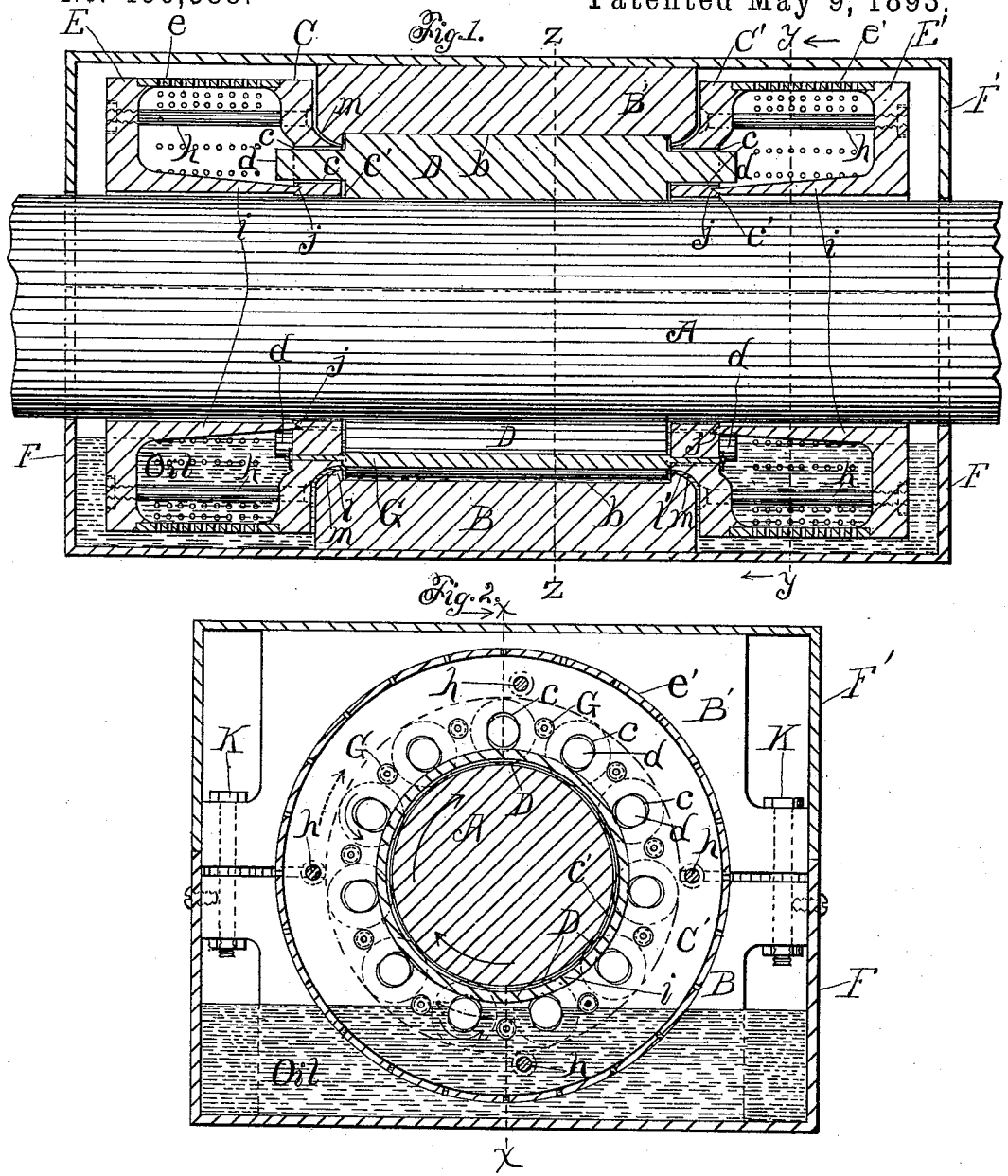

(No Model.) 2 Sheets—Sheet 2.

A. MORRISON.
SELF OILING ANTIFRICTION ROLLER JOURNAL BEARING.

No. 496,888. Patented May 9, 1893.

Witnesses.
M. M. Gee.
F. M. Townsend.

Inventor.
Alonzo Morrison
by Hazard & Townsend
his Attys.

UNITED STATES PATENT OFFICE.

ALONZO MORRISON, OF LOS ANGELES, CALIFORNIA, ASSIGNOR OF ONE-FOURTH TO FRANK H. GLEASON, OF SAME PLACE.

SELF-OILING ANTIFRICTION-ROLLER JOURNAL-BEARING.

SPECIFICATION forming part of Letters Patent No. 496,888, dated May 9, 1893.

Application filed June 17, 1892. Serial No. 437,043. (No model.)

*To all whom it may concern:*

Be it known that I, ALONZO MORRISON, a citizen of the United States, residing at Los Angeles, in the county of Los Angeles and State of California, have invented a new and useful Self-Oiling Antifriction Device, of which the following is a specification.

My invention comprises the combination of a shaft; an anti-friction roller bearing comprising a cage having anti-friction rollers and arranged to revolve and rotate about the shaft; an auxiliary oil carrying cap arranged at each end of such roller carrying cage and adapted to rotate therewith and having an inclined annular hoop arranged to conduct the oil downward into the roller carrying cage, as the cage and oil cap revolve about the shaft.

My invention also comprises other features hereinafter set forth and claimed.

The accompanying drawings illustrate my invention.

Figure 3:
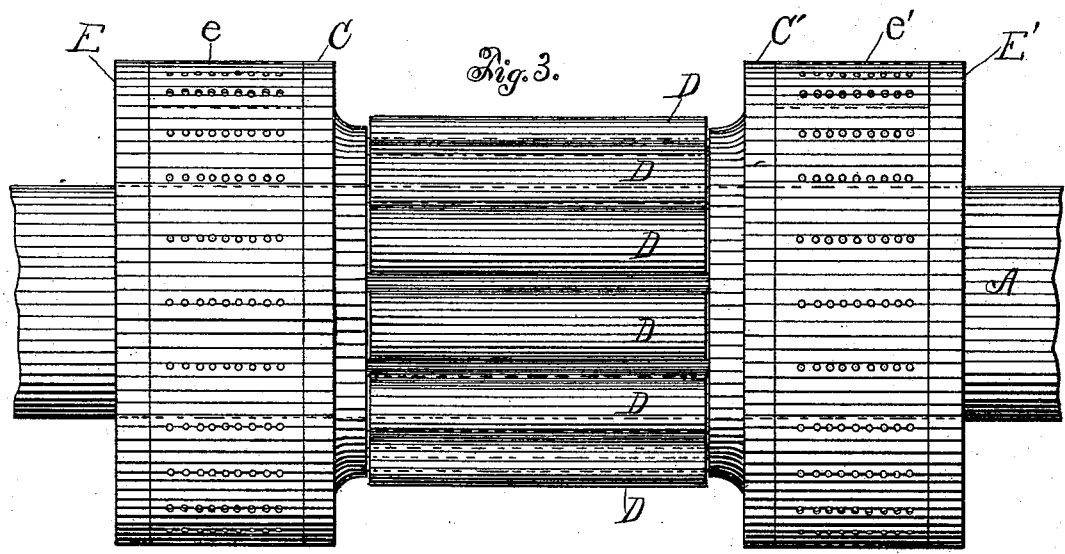
Figure 4:
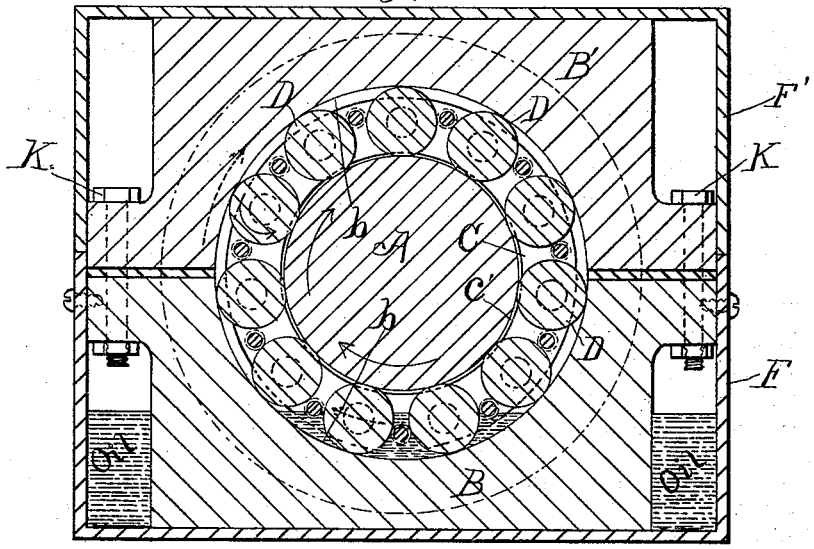

Figure 1 is a vertical longitudinal mid-section of my invention as applied to a straight cylindrical shaft. *x—x* Fig. 2 indicate the line of section, the shaft being left intact. Fig. 2 is a transverse section on line *y—y* Fig. 1 looking in the direction of the arrow. Fig. 3 is a side elevation of the journal bearing comprising the anti-friction rollers and their collars or frames and mounted upon the shaft but removed from the journal box. Fig. 4 is a transverse section on line *z—z* Fig. 1.

A indicates the shaft or journal.

B B' indicate the box which is designed to rest upon a support (not shown).

The drawings are made to illustrate only one mode of applying my invention.

The roller bearing cage shown comprises the two annular collars C C' secured to each other and provided respectively with a central shaft opening *c'* and a series of radially elongated elliptical holes *c* in which are journaled the gudgeons *d* of the anti-friction rollers D as is customary in bearings of this description. The members B B' of the box are arranged as customarily arranged in roller bearings of this class. The collars C and C' are respectively provided with oil caps E E' secured to the end faces of their respective collars and comprising the annular hoop *i* tapering toward the cage, and the outer perforated walls *e e'*; such caps are inclosed in an oil reservoir F which is arranged below the shaft and is secured to the box. The collars C C' are secured to each other by means of bolts G.

In practice the oil cap and the perforated wall are made in two parts as shown in the drawings, the circular perforated wall *e* (*e'*) being clamped between the collar and main member E (E') of the oil cap by means of the bolts *h*. The oil cap is provided with an annular hoop *i* the end of which is set into a circular oil cap groove *j* in the collar intermediate the radially elongated gudgeon holes *c* and the central journal opening *c'*. In practice the collars with their rollers in place are secured together by the bolts G and the journal is passed into the opening between such rollers. The radial elongation of the holes *c* allowing the rollers to be spread apart sufficient to allow convenient insertion of the journal endwise into the opening within the circle of such rollers. When the journal is in place, the rollers are seated in the grooved box B B' the two members of which are then secured together by suitable means such as the bolts K. The oil reservoir F may then be placed in position. (Or it is to be understood that such oil reservoir may be made integral with the bearing box or bed or that it may be secured to such box at any time as may be most convenient.) There is then placed in the reservoir a sufficient quantity of oil to immerse a portion of the rollers and the oil carrying cap and the device is in condition for satisfactory use.

F' indicates a cap for the oil reservoir. This cap can be removed at any time to allow oil to be put into the reservoir.

The various parts are so arranged and constructed with relation to each other and to the shaft that no part of the roller bearing comes in contact with the shaft or with the box excepting the rollers D, thus practically avoiding any friction. The rotation of the shaft operates to rotate the rollers, which in turn rotate within the box, and thus carries the cage around the shaft. The various rollers and the oil cap are thus submerged in the oil and then rise above the shaft, thus carrying the oil with them so that the rotation of the shaft and the rollers operates to carry the oil from the oil chamber to every part of the bearing.

In Fig. 2 the dotted arrow indicates the direction in which the collar with its rollers will rotate when the shaft rotates in the direction of the large curved arrow. The small curved arrow indicates the direction of rotation of the anti-friction series at the same time. The annular hoop $i$ of the oil cap tapers inward toward the collar and axle so that the oil which falls thereupon is directed toward the elliptical holes $c$ through which it flows into the space between the collars where it is discharged upon the axle. There is sufficient oil way or space $m$ left between the box and the collars C C' to allow the oil to flow from the oil reservoir through such space to the rollers and also to return from the rollers to the oil reservoir. A slight projecting ledge $l$ ($l'$) is provided at each end of the bearing face $b$ of the box to retain a quantity of oil in the bottom of the box, and as more oil is added to the bearing by the action of the oil cap as hereinbefore explained, the surplus oil flows out through the openings $m$— into the oil reservoir and is again fed to the bearing by the oil caps, thus preventing gumming of the oil from constant wear of an unrenewed quantity of oil.

Now, having described my invention, what I claim as new, and desire to secure by Letters Patent, is—

1. The combination set forth of the shaft; an anti-friction roller-bearing comprising a cage having anti-friction rollers and arranged and adapted to rotate about the shaft; an auxiliary oil-carrying cap arranged at one end of such roller-carrying cage and adapted to rotate therewith and comprising an annular hoop having its outer face tapering toward such roller cage, and a suitable oil reservoir arranged to contain a quantity of oil to submerge a portion of such hoop.

2. The combination set forth of a shaft; an anti-friction roller-bearing comprising a cage having anti-friction rollers and arranged and adapted to rotate about the shaft; an auxiliary oil-carrying cap arranged at each end of such roller-carrying cage and adapted to rotate therewith, and each comprising an annular hoop tapering toward such roller-carrying cage and a perforate annular hoop arranged exterior such tapering hoop, and an oil reservoir arranged to contain a quantity of oil to submerge the lower portion of such oil cap.

3. The combination of the shaft; the cage comprising the collars provided with a series of anti-friction rollers and arranged and adapted to rotate about the shaft; an oil cap fixed to such cage and adapted by its rotation therewith to feed oil from a reservoir to the top of the bearing; such oil reservoir arranged below such bearing; the box provided with a projecting ledge at each end of its bearing face and arranged to retain a quantity of oil in the bottom of such box, the cage being arranged to leave a space between the collars of the cage and the ends of the box, and arranged to allow the overflow of oil to return to such oil reservoir.

ALONZO MORRISON.

Witnesses:
JAMES R. TOWNSEND,
ALFRED I. TOWNSEND.